United States Patent
Nook et al.

(10) Patent No.: US 9,770,992 B2
(45) Date of Patent: Sep. 26, 2017

(54) PORTABLE VEHICLE BATTERY JUMP START APPARATUS WITH SAFETY PROTECTION AND JUMPER CABLE DEVICE THEREFOR

(71) Applicant: The NOCO Company, Glenwillow, OH (US)

(72) Inventors: Jonathan Lewis Nook, Gates Mills, OH (US); William Knight Nook, Shaker Heights, OH (US); James Richard Stanfield, Peoria, AZ (US); Derek Michael Underhill, Chandler, AZ (US)

(73) Assignee: THE NOCO COMPANY, Glenwillow, OH (US)

( * ) Notice: Subject to any disclaimer, the term of this patent is extended or adjusted under 35 U.S.C. 154(b) by 0 days.

(21) Appl. No.: 14/619,655

(22) Filed: Feb. 11, 2015

(65) Prior Publication Data
US 2016/0001666 A1    Jan. 7, 2016

Related U.S. Application Data

(60) Division of application No. 14/325,938, filed on Jul. 8, 2014, now Pat. No. 9,007,015, which is a (Continued)

(51) Int. Cl.
*H02J 7/14* (2006.01)
*H02J 7/00* (2006.01)
(Continued)

(52) U.S. Cl.
CPC ......... *B60L 11/1816* (2013.01); *H02J 7/0029* (2013.01); *H02J 7/0034* (2013.01);
(Continued)

(58) Field of Classification Search
CPC ....... H02J 7/00; H02J 7/0034; H02J 2001/006
(Continued)

(56) References Cited

U.S. PATENT DOCUMENTS

| 3,933,140 A * | 1/1976 | Gynn | F02P 3/0838 123/595 |
| 4,041,445 A * | 8/1977 | Carter | G01V 1/22 174/70 R |

(Continued)

FOREIGN PATENT DOCUMENTS

| DE | 29507501 U1 | 6/1995 |
| DE | 202009016260 U1 | 3/2010 |

(Continued)

OTHER PUBLICATIONS

International Search Report in corresponding PCT/US2014/045434, Nov. 3, 2014.

*Primary Examiner* — M'Baye Diao
(74) *Attorney, Agent, or Firm* — Vorys, Sater, Seymour and Pease LLP; William L. Klima

(57) ABSTRACT

A handheld device for jump starting a vehicle engine includes a rechargeable lithium ion battery pack and a microcontroller. The lithium ion battery is coupled to a power output port of the device through a FET smart switch actuated by the microcontroller. A vehicle battery isolation sensor connected in circuit with positive and negative polarity outputs detects the presence of a vehicle battery connected between the positive and negative polarity outputs. A reverse polarity sensor connected in circuit with the positive and negative polarity outputs detects the polarity of a vehicle battery connected between the positive and negative polarity outputs, such that the microcontroller will enable power to be delivered from the lithium ion power pack to the output port only when a good battery is connected to the output port (Continued)

and only when the battery is connected with proper polarity of positive and negative terminals.

21 Claims, 13 Drawing Sheets

Related U.S. Application Data continuation of application No. PCT/US2014/045434, filed on Jul. 3, 2014.

(51) Int. Cl.
*B60L 11/18* (2006.01)
*H02J 1/00* (2006.01)

(52) U.S. Cl.
CPC .......... *H02J 7/0047* (2013.01); *H02J 7/0054* (2013.01); *H02J 2001/006* (2013.01); *H02J 2007/005* (2013.01); *H02J 2007/0062* (2013.01)

(58) Field of Classification Search
USPC .......................................... 320/105; 307/150
See application file for complete search history.

(56) References Cited

U.S. PATENT DOCUMENTS

| | | | |
|---|---|---|---|
| 4,885,524 A | 12/1989 | Wilburn | |
| 4,910,628 A | 3/1990 | Minagawa et al. | |
| 4,931,731 A * | 6/1990 | Jenks ................... | G01N 27/84 324/216 |
| 5,083,076 A | 1/1992 | Scott | |
| 5,111,130 A | 5/1992 | Bates | |
| 5,189,359 A | 2/1993 | Kronberg | |
| 5,486,434 A * | 1/1996 | Aoyama .............. | H01R 11/283 429/121 |
| 5,635,817 A | 6/1997 | Shiska | |
| 5,635,818 A | 6/1997 | Quintero | |
| 5,793,185 A | 8/1998 | Prelec et al. | |
| 5,795,182 A | 8/1998 | Jacob | |
| 5,921,809 A | 7/1999 | Fink | |
| 5,965,998 A | 10/1999 | Whiting et al. | |
| 6,054,779 A * | 4/2000 | Zubko ................... | B60Q 1/305 307/10.8 |
| 6,130,519 A | 10/2000 | Whiting et al. | |
| 6,140,796 A | 10/2000 | Martin et al. | |
| 6,147,471 A * | 11/2000 | Hunter ................. | H01R 11/287 320/105 |
| 6,212,054 B1 * | 4/2001 | Chan .................... | H02J 7/0034 307/10.7 |
| 6,262,492 B1 | 7/2001 | Sheng | |
| 6,262,559 B1 | 7/2001 | Eggert et al. | |
| 6,362,599 B1 | 3/2002 | Turner et al. | |
| 6,632,103 B1 | 10/2003 | Liu | |
| 6,648,701 B2 * | 11/2003 | Mouissie ............. | H01R 11/286 439/760 |
| 6,756,764 B2 | 6/2004 | Smith et al. | |
| 6,803,743 B2 | 10/2004 | George et al. | |
| 7,148,580 B2 | 12/2006 | Sodemann et al. | |
| 7,301,303 B1 | 11/2007 | Hulden | |
| 7,749,031 B2 * | 7/2010 | Detter ................. | H01R 11/282 439/772 |
| 7,872,361 B2 | 1/2011 | McFadden | |
| 8,076,900 B1 * | 12/2011 | Brown .................... | F02N 11/14 320/105 |
| 8,172,603 B1 | 5/2012 | Richardet, Jr. | |
| 8,199,024 B2 | 6/2012 | Baxter et al. | |
| 8,376,775 B2 | 2/2013 | Rinehardt | |
| 8,493,021 B2 | 7/2013 | Richardson et al. | |
| 2002/0041174 A1 | 4/2002 | Purkey | |
| 2004/0130298 A1 | 7/2004 | Krieger et al. | |
| 2005/0040788 A1 | 2/2005 | Tseng | |
| 2005/0110467 A1 | 5/2005 | Thomason | |
| 2005/0252573 A1 | 11/2005 | Montani | |
| 2007/0285049 A1 | 12/2007 | Krieger et al. | |
| 2010/0301800 A1 | 12/2010 | Inskeep | |
| 2011/0068734 A1* | 3/2011 | Waldron ............... | H02J 7/0042 320/107 |
| 2012/0091944 A1 | 4/2012 | Rogers | |
| 2013/0154543 A1 | 6/2013 | Richardson et al. | |
| 2013/0314041 A1 | 11/2013 | Proebstle | |
| 2014/0159509 A1 | 6/2014 | Inskeep | |

FOREIGN PATENT DOCUMENTS

| | | |
|---|---|---|
| DE | 202013102599 U1 | 8/2013 |
| EP | 2472698 A2 | 7/2012 |
| WO | 2004036714 A2 | 4/2004 |
| WO | 2013-137873 A1 | 9/2013 |

* cited by examiner

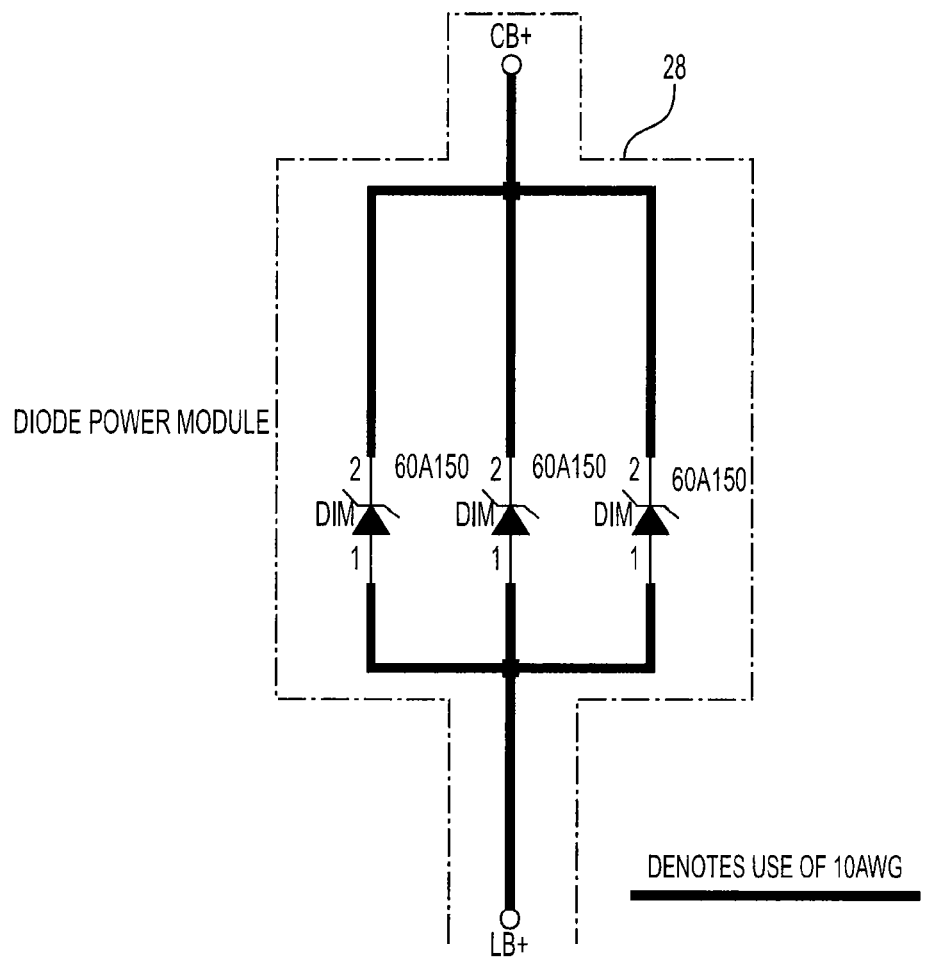
FIG. 2B-1
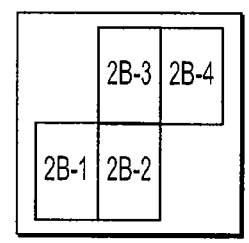

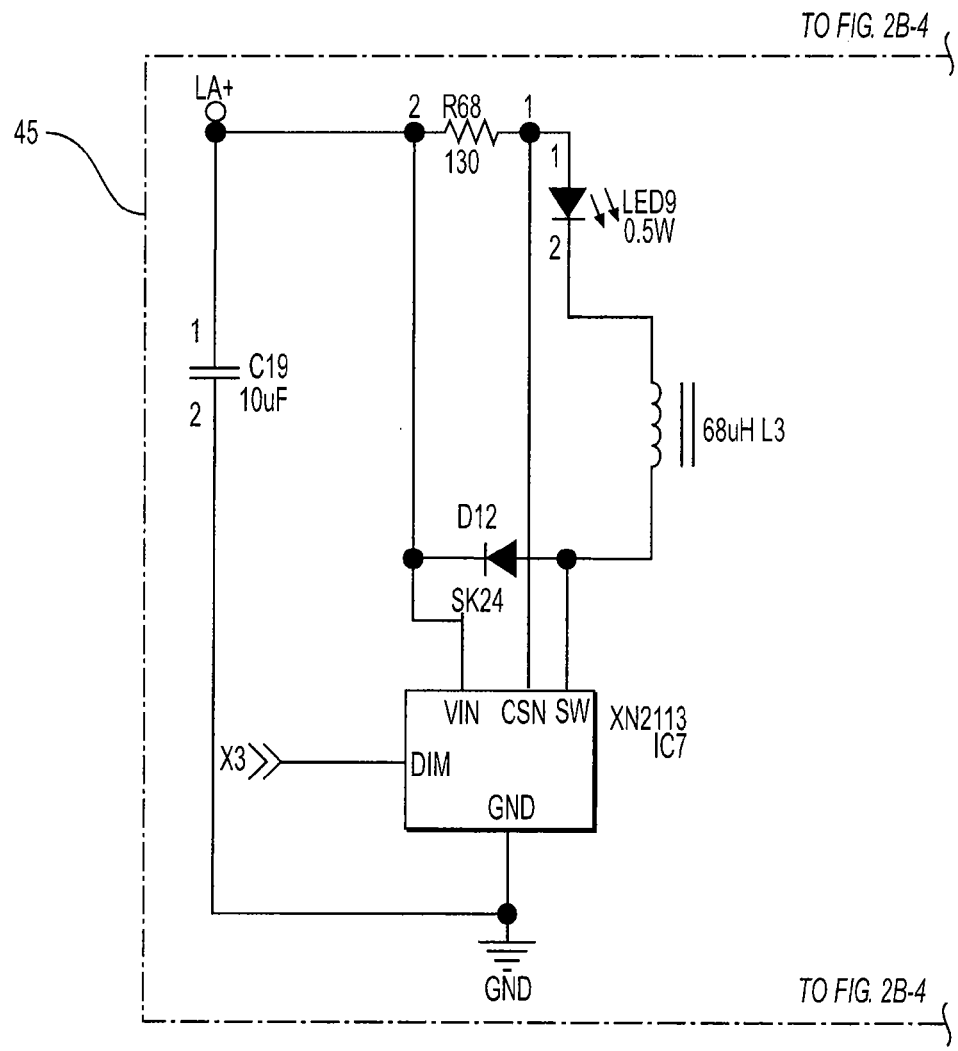
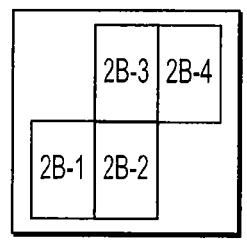
FIG. 2B-3

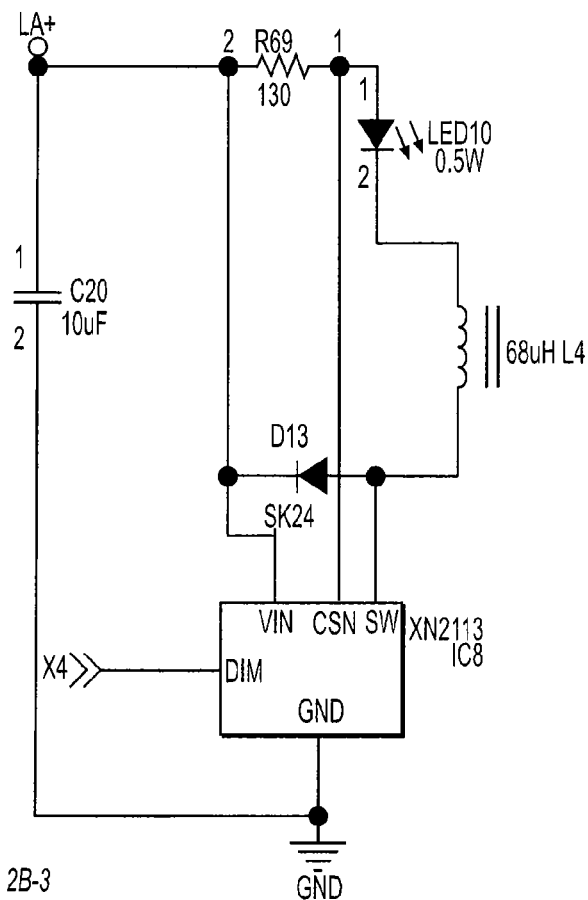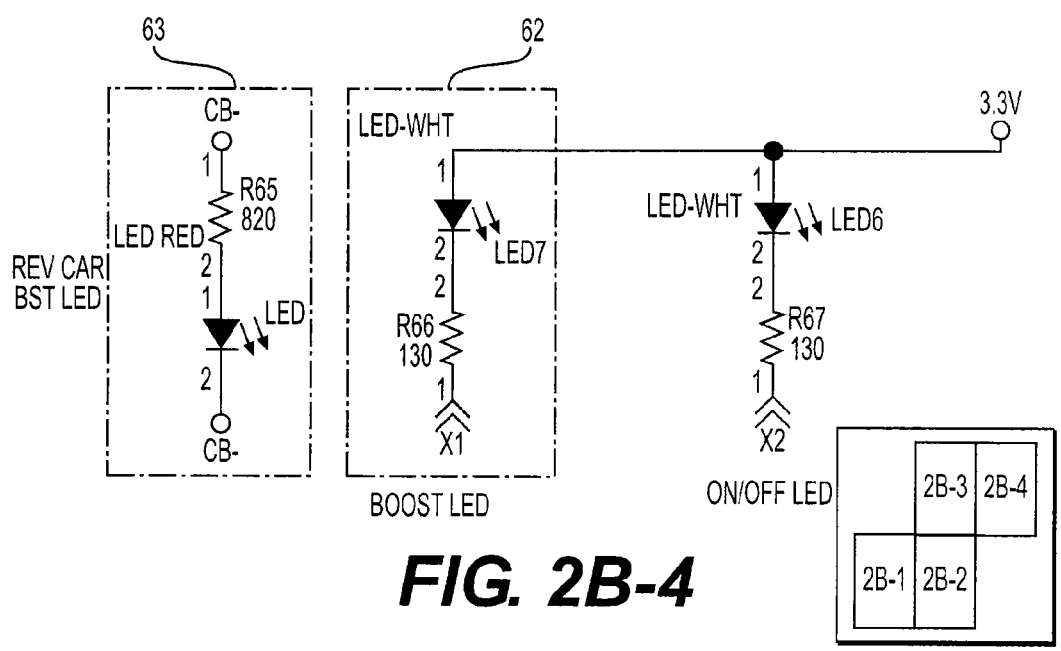
FIG. 2B-4

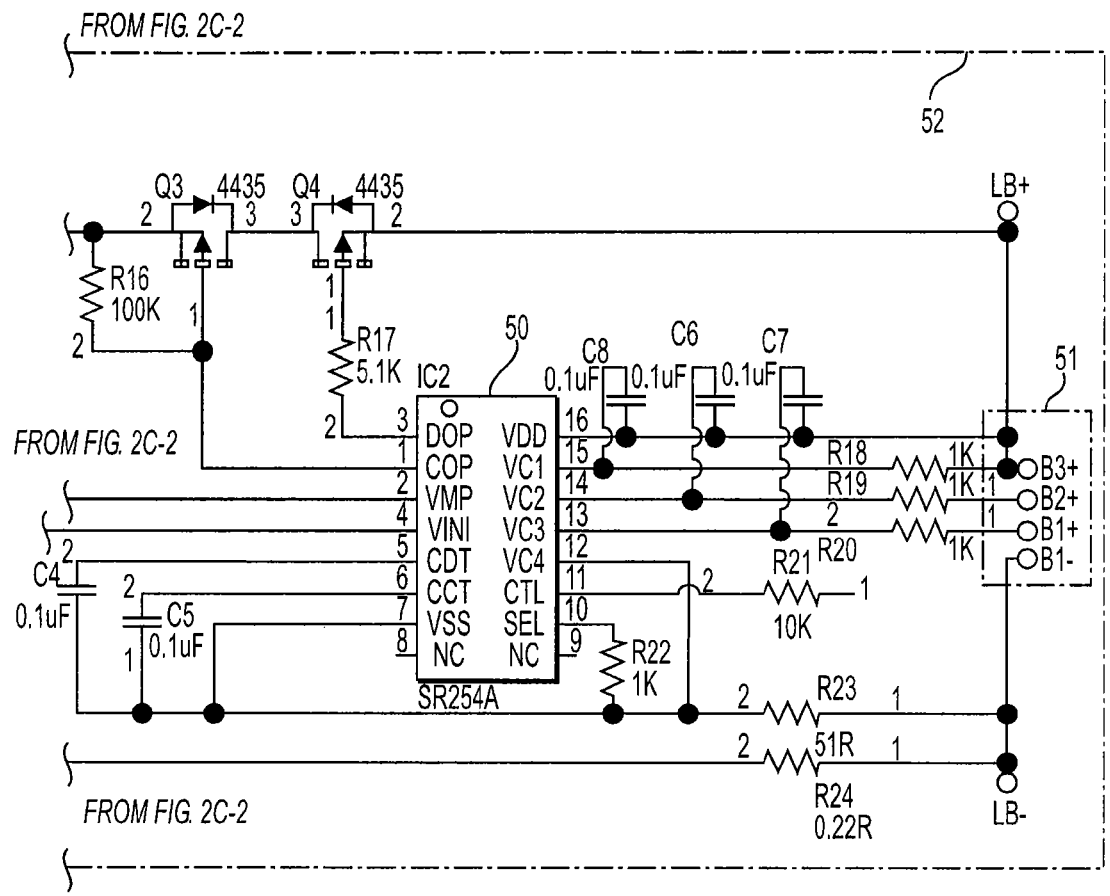
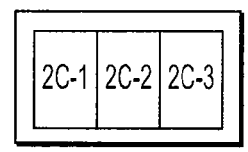
FIG. 2C-3

PORTABLE VEHICLE BATTERY JUMP START APPARATUS WITH SAFETY PROTECTION AND JUMPER CABLE DEVICE THEREFOR

BACKGROUND OF THE INVENTION

The present invention relates generally to apparatus for jump-starting a vehicle having a depleted or discharged battery. Prior art devices are known, which provide either a pair of electrical connector cables that connect a fully-charged battery of another vehicle to the engine start circuit of the dead battery vehicle, or portable booster devices which include a fully-charged battery which can be connected in circuit with the vehicle's engine starter through a pair of cables.

Problems with the prior art arose when either the jumper terminals or clamps of the cables were inadvertently brought into contact with each other while the other ends were connected to a charged battery, or when the positive and negative terminals were connected to the opposite polarity terminals in the vehicle to be jumped, thereby causing a short circuit resulting in sparking and potential damage to batteries and/or bodily injury.

Various attempts to eliminate these problems have been made in the prior art. U.S. Pat. No. 6,212,054 issued Apr. 3, 2001, discloses a battery booster pack that is polarity sensitive and can detect proper and improper connections before providing a path for electric current flow. The device uses a set of LEDs connected to optical couplers oriented by a control circuit. The control circuit controls a solenoid assembly controlling the path of power current. The control circuit causes power current to flow through the solenoid assembly only if the points of contact of booster cable clamp connections have been properly made.

U.S. Pat. No. 6,632,103 issued Oct. 14, 2003, discloses an adaptive booster cable connected with two pairs of clips, wherein the two pairs of clips are respectively attached to two batteries to transmit power from one battery to the other battery. The adaptive booster cable includes a polarity detecting unit connected to each clip, a switching unit and a current detecting unit both provided between the two pairs of clips. After the polarity of each clip is sensed by the polarity detecting unit, the switching unit generates a proper connection between the two batteries. Therefore, the positive and negative terminals of the two batteries are correctly connected based on the detected result of the polarity detecting unit.

U.S. Pat. No. 8,493,021 issued Jul. 23, 2013, discloses apparatus that monitors the voltage of the battery of a vehicle to be jump started and the current delivered by the jump starter batteries to determine if a proper connection has been established and to provide fault monitoring. Only if the proper polarity is detected can the system operate. The voltage is monitored to determine open circuit, disconnected conductive clamps, shunt cable fault, and solenoid fault conditions. The current through the shunt cable is monitored to determine if there is a battery explosion risk, and for excessive current conditions presenting an overheating condition, which may result in fire. The system includes an internal battery to provide the power to the battery of the vehicle to be jump started. Once the vehicle is started, the unit automatically electrically disconnects from the vehicle's battery.

U.S. Pat. No. 5,189,359 issued Feb. 23, 1993, discloses a jumper cable device having two bridge rectifiers for developing a reference voltage, a four-input decoder for determining which terminals are to be connected based on a comparison of the voltage at each of the four terminals to the reference voltage, and a pair of relays for effecting the correct connection depending on the determination of the decoder. No connection will be made unless only one terminal of each battery has a higher voltage than the reference voltage, indicating "positive" terminals, and one has a lower voltage than the reference voltage, indicating "negative" terminals, and that, therefore, the two high voltage terminals may be connected and the two lower voltage terminals may be connected. Current flows once the appropriate relay device is closed. The relay device is preferably a MOSFET combined with a series array of photodiodes that develop MOSFET gate-closing potential when the decoder output causes an LED to light.

U.S. Pat. No. 5,795,182 issued Aug. 18, 1998, discloses a polarity independent set of battery jumper cables for jumping a first battery to a second battery. The apparatus includes a relative polarity detector for detecting whether two batteries are configured cross or parallel. A three-position high current capacity crossbar pivot switch is responsive to the relative polarity detector for automatically connecting the plus terminals of the two batteries together and the minus terminals of the two batteries together regardless of whether the configuration detected is cross or parallel, and an under-current detector and a delay circuit for returning the device to its ready and unconnected state after the device has been disconnected from one of the batteries. The crossbar pivot switch includes two pairs of contacts, and a pivot arm that pivots about two separate points to ensure full electrical contact between the pairs of contacts. The invention can also be used to produce a battery charger that may be connected to a battery without regard to the polarity of the battery.

U.S. Pat. No. 6,262,492 issued Jul. 17, 2001, discloses a car battery jumper cable for accurately coupling an effective power source to a failed or not charged battery, which includes a relay switching circuit connected to the power source and the battery by two current conductor pairs. First and second voltage polarity recognition circuits are respectively connected to the power source and the battery by a respective voltage conductor pair to recognize the polarity of the power source and the battery. A logic recognition circuit produces a control signal subject to the polarity of the power source and the battery, and a driving circuit controlled by the control signal from the logic recognition circuit drives the relay switching circuit, enabling the two poles of the power source to be accurately coupled to the two poles of the battery.

U.S. Pat. No. 5,635,817 issued Jun. 3, 1997, discloses a vehicle battery charging device that includes a control housing having cables including a current limiting device to prevent exceeding of a predetermined maximum charging current of about 40 to 60 amps. The control housing includes a polarity detecting device to verify the correct polarity of the connection of the terminals of the two batteries and to electrically disconnect the two batteries if there is an incorrect polarity.

U.S. Pat. No. 8,199,024 issued Jun. 12, 2012, discloses a safety circuit in a low-voltage connecting system that leaves the two low-voltage systems disconnected until it determines that it is safe to make a connection. When the safety circuit determines that no unsafe conditions exist and that it is safe to connect the two low-voltage systems, the safety circuit may connect the two systems by way of a "soft start" that provides a connection between the two systems over a period of time that reduces or prevents inductive voltage spikes on one or more of the low-voltage systems. When one of the low-voltage systems has a completely-discharged battery incorporated into it, a method is used for detection of proper polarity of the connections between the low-voltage systems. The polarity of the discharged battery is determined by passing one or more test currents through it and determining whether a corresponding voltage rise is observed.

U.S. Pat. No. 5,793,185 issued Aug. 11, 1998, discloses a hand-held jump starter having control components and circuits to prevent overcharging and incorrect connection to batteries.

While the prior art attempted solutions to the abovementioned problems as discussed above, each of the prior art solutions suffers from other shortcomings, either in complexity, cost or potential for malfunction. Accordingly, there exists a need in the art for further improvements to vehicle jump start devices.

SUMMARY OF THE INVENTION

In accordance with an aspect of the invention, apparatus is provided for jump starting a vehicle engine, including: an internal power supply; an output port having positive and negative polarity outputs; a vehicle battery isolation sensor connected in circuit with said positive and negative polarity outputs, configured to detect presence of a vehicle battery connected between said positive and negative polarity outputs; a reverse polarity sensor connected in circuit with said positive and negative polarity outputs, configured to detect polarity of a vehicle battery connected between said positive and negative polarity outputs; a power FET switch connected between said internal power supply and said output port; and a microcontroller configured to receive input signals from said vehicle isolation sensor and said reverse polarity sensor, and to provide an output signal to said power FET switch, such that said power FET switch is turned on to connect said internal power supply to said output port in response to signals from said sensors indicating the presence of a vehicle battery at said output port and proper polarity connection of positive and negative terminals of said vehicle battery with said positive and negative polarity outputs.

In accordance with another aspect of the invention, the internal power supply is a rechargeable lithium ion battery pack.

In accordance with yet another aspect of the invention, a jumper cable device is provided, having a plug configured to plug into an output port of a handheld battery charger booster device having an internal power supply; a pair of cables integrated with the plug at one respective end thereof; said pair of cables being configured to be separately connected to terminals of a battery at another respective end thereof.

BRIEF DESCRIPTION OF THE DRAWINGS

FIGS. 2A-1-2C-3 are schematic circuit diagrams of an example embodiment of a handheld vehicle battery boost apparatus in accordance with an aspect of the invention;

FIG. 3 is a perspective view of a handheld jump starter booster device in accordance with one example embodiment of the invention.

DETAILED DESCRIPTION OF THE INVENTION

Figure 1:
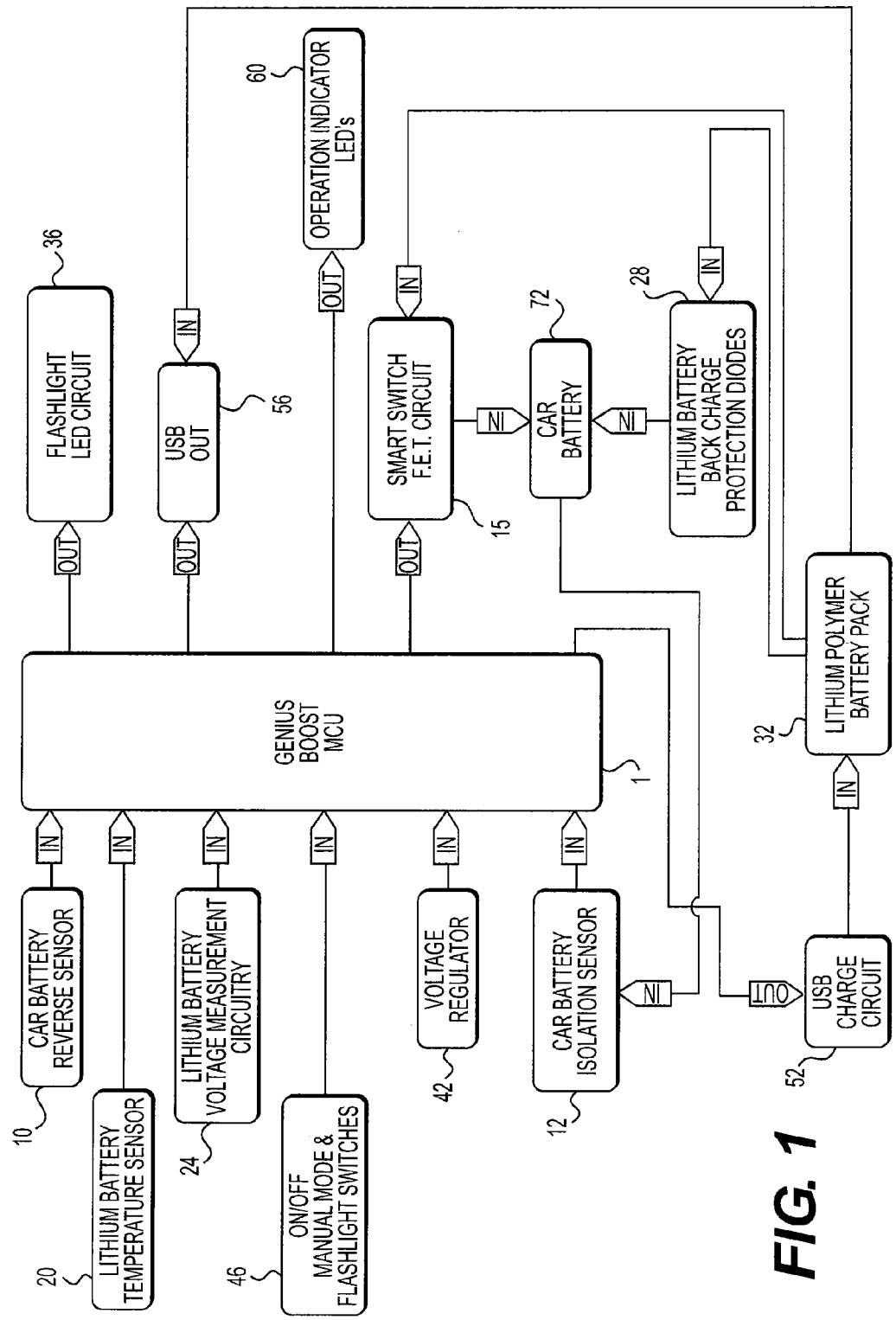
FIG. 1 is a functional block diagram of a handheld vehicle battery boost apparatus in accordance with one aspect of the present invention.

FIG. 1 is a functional block diagram of a handheld battery booster according to one aspect of the invention. At the heart of the handheld battery booster is a lithium polymer battery pack 32, which stores sufficient energy to jump start a vehicle engine served by a conventional 12 volt lead-acid or valve regulated lead-acid battery. In one example embodiment, a high-surge lithium polymer battery pack includes three 3.7V, 2666 mAh lithium polymer batteries in a 3S1P configuration. The resulting battery pack provides 11.1V, 2666 Ah (8000 Ah at 3.7V, 29.6 Wh). Continuous discharge current is 25 C (or 200 amps), and burst discharge current is 50 C (or 400 amps). The maximum charging current of the battery pack is 8000 mA (8 amps).

A programmable microcontroller unit (MCU) 1 receives various inputs and produces informational as well as control outputs. The programmable MCU 1 further provides flexibility to the system by allowing updates in functionality and system parameters, without requiring any change in hardware. According to one example embodiment, an 8 bit microcontroller with 2K×15 bits of flash memory is used to control the system. One such microcontroller is the HT67F30, which is commercially available from Holtek Semiconductor Inc.

A car battery reverse sensor 10 monitors the polarity of the vehicle battery 72 when the handheld battery booster device is connected to the vehicle's electric system. As explained below, the booster device prevents the lithium battery pack from being connected to the vehicle battery 72 when the terminals of the battery 72 are connected to the wrong terminals of the booster device. A car battery isolation sensor 12 detects whether or not a vehicle battery 72 is connected to the booster device, and prevents the lithium battery pack from being connected to the output terminals of the booster device unless there is a good (e.g. chargeable) battery connected to the output terminals.

A smart switch FET circuit 15 electrically switches the handheld battery booster lithium battery to the vehicle's electric system only when the vehicle battery is determined by the MCU 1 to be present (in response to a detection signal provided by isolation sensor 12) and connected with the correct polarity (in response to a detection signal provided by reverse sensor 10). A lithium battery temperature sensor 20 monitors the temperature of the lithium battery pack 32 to detect overheating due to high ambient temperature conditions and overextended current draw during jump starting. A lithium battery voltage measurement circuit 24 monitors the voltage of the lithium battery pack 32 to prevent the voltage potential from rising too high during a charging operation and from dropping too low during a discharge operation.

Lithium battery back-charge protection diodes 28 prevent any charge current being delivered to the vehicle battery 72 from flowing back to the lithium battery pack 32 from the vehicle's electrical system. Flashlight LED circuit 36 is provided to furnish a flashlight function for enhancing light under a vehicle's hood in dark conditions, as well as providing SOS and strobe lighting functions for safety purposes when a vehicle may be disabled in a potentially dangerous location. Voltage regulator 42 provides regulation of internal operating voltage for the microcontroller and sensors. On/Off manual mode and flashlight switches 46 allow the user to control power-on for the handheld battery booster device, to control manual override operation if the vehicle has no battery, and to control the flashlight function.

The manual button functions only when the booster device is powered on. This button allows the user to jump-start vehicles that have either a missing battery, or the battery voltage is so low that automatic detection by the MCU is not possible. When the user presses and holds the manual override button for a predetermined period time (such as three seconds) to prevent inadvertent actuation of the manual mode, the internal lithium ion battery power is switched to the vehicle battery connect port. The only exception to the manual override is if the car battery is connected in reverse. If the car battery is connected in reverse, the internal lithium battery power shall never be switched to the vehicle battery connect port.

USB charge circuit 52 converts power from any USB charger power source, to charge voltage and current for charging the lithium battery pack 32. USB output 56 provides a USB portable charger for charging smartphones, tablets, and other rechargeable electronic devices. Operation indicator LEDs 60 provide visual indication of lithium battery capacity status as well as an indication of smart switch activation status (indicating that power is being provided to the vehicle's electrical system).

Figures 1, 2A:
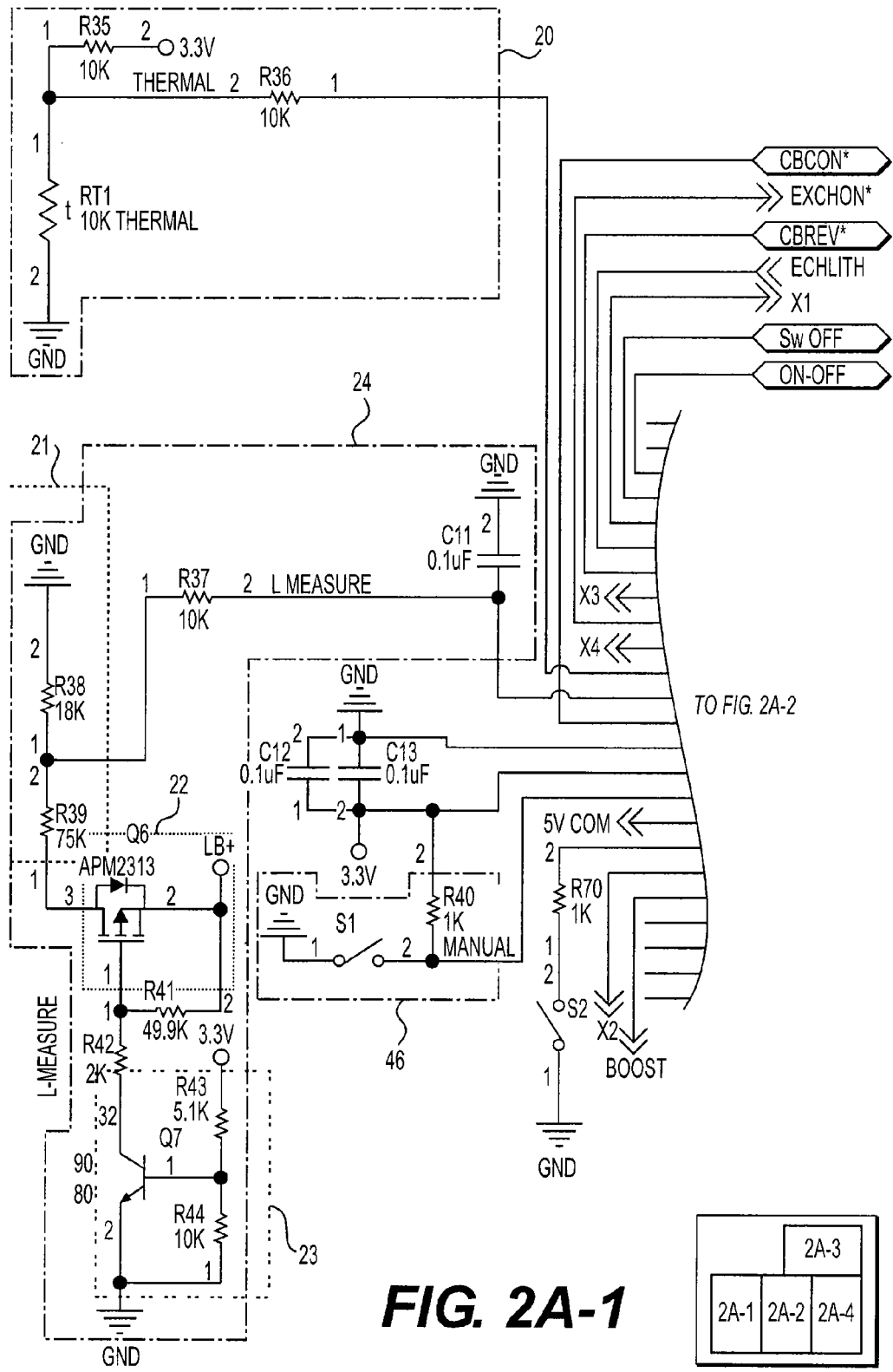
Figure 2A:
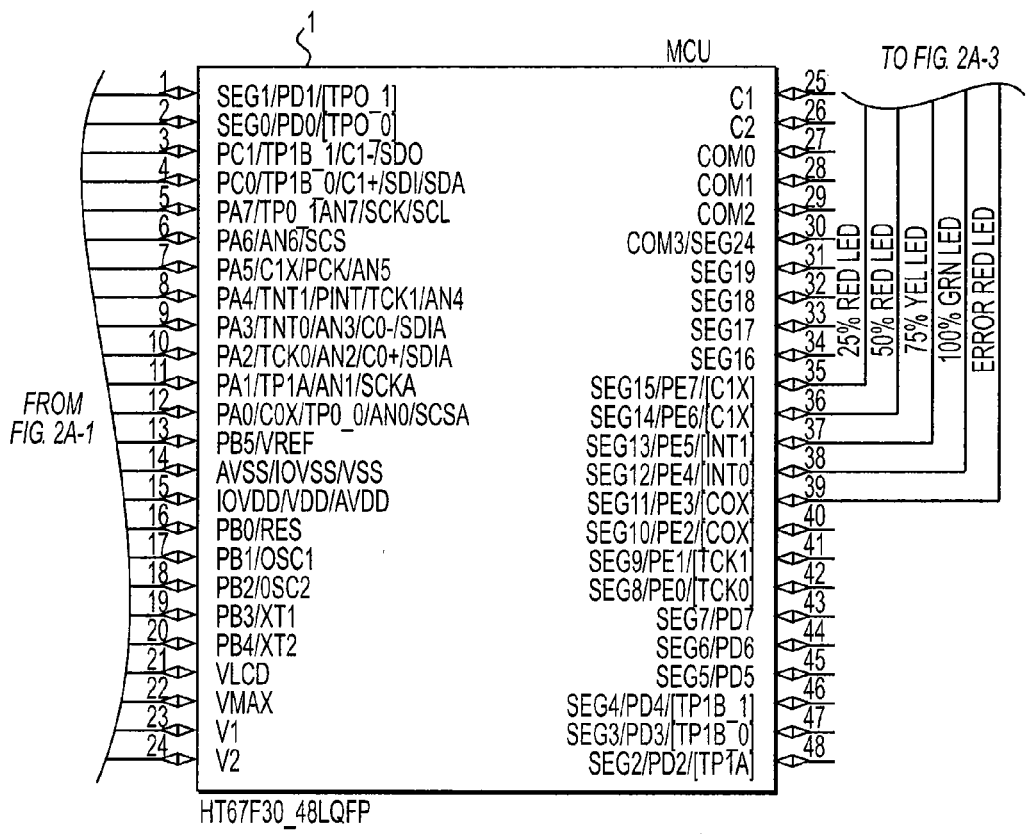
Figure 2:
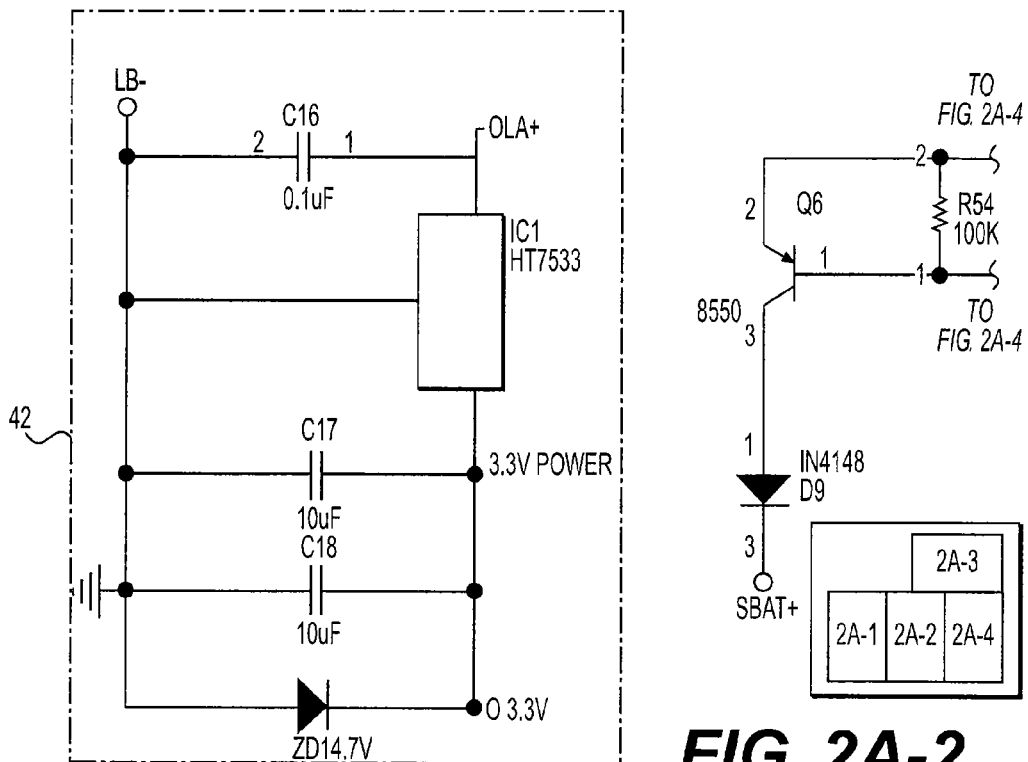

Detailed operation of the handheld booster device will now be described with reference to the schematic diagrams of FIGS. 2A-1-2C-3. As shown in FIG. 2A-2, the microcontroller unit 1 is the center of all inputs and outputs. The reverse battery sensor 10 comprises an optically coupled isolator phototransistor (4N27) connected to the terminals of vehicle battery 72 at input pins 1 and 2 with a diode D8 in the lead conductor of pin 1 (associated with the negative terminal CB−), such that if the battery 72 is connected to the terminals of the booster device with the correct polarity, the optocoupler LED 11 will not conduct current, and is therefore turned off, providing a "1" or high output signal to the MCU 1. The car battery isolation sensor 12 comprises an optically coupled isolator phototransistor (4N27) connected to the terminals of vehicle battery 72 at input pins 1 and 2 with a diode D7 in the lead conductor of pin 1 (associated with the positive terminal CB+), such that if the battery 72 is connected to the terminals of the booster device with the correct polarity, the optocoupler LED 11A will conduct current, and is therefore turned on, providing a "0" or low output signal to the MCU, indicating the presence of a battery across the jumper output terminals of the handheld booster device.

If the car battery 72 is connected to the handheld booster device with reverse polarity, the optocoupler LED 11 of the reverse sensor 10 will conduct current, providing a "0" or low signal to microcontroller unit 1. Further, if no battery is connected to the handheld booster device, the optocoupler LED 11A of the isolation sensor 12 will not conduct current, and is therefore turned off, providing a "1" or high output signal to the MCU, indicating the absence of any battery connected to the handheld booster device. Using these specific inputs, the microcontroller software of MCU 1 can determine when it is safe to turn on the smart switch FET 15, thereby connecting the lithium battery pack to the jumper terminals of the booster device. Consequently, if the car battery 72 either is not connected to the booster device at all, or is connected with reverse polarity, the MCU 1 can keep the smart switch FET 15 from being turned on, thus prevent sparking/short circuiting of the lithium battery pack.

Figures 2, 2A, 3:
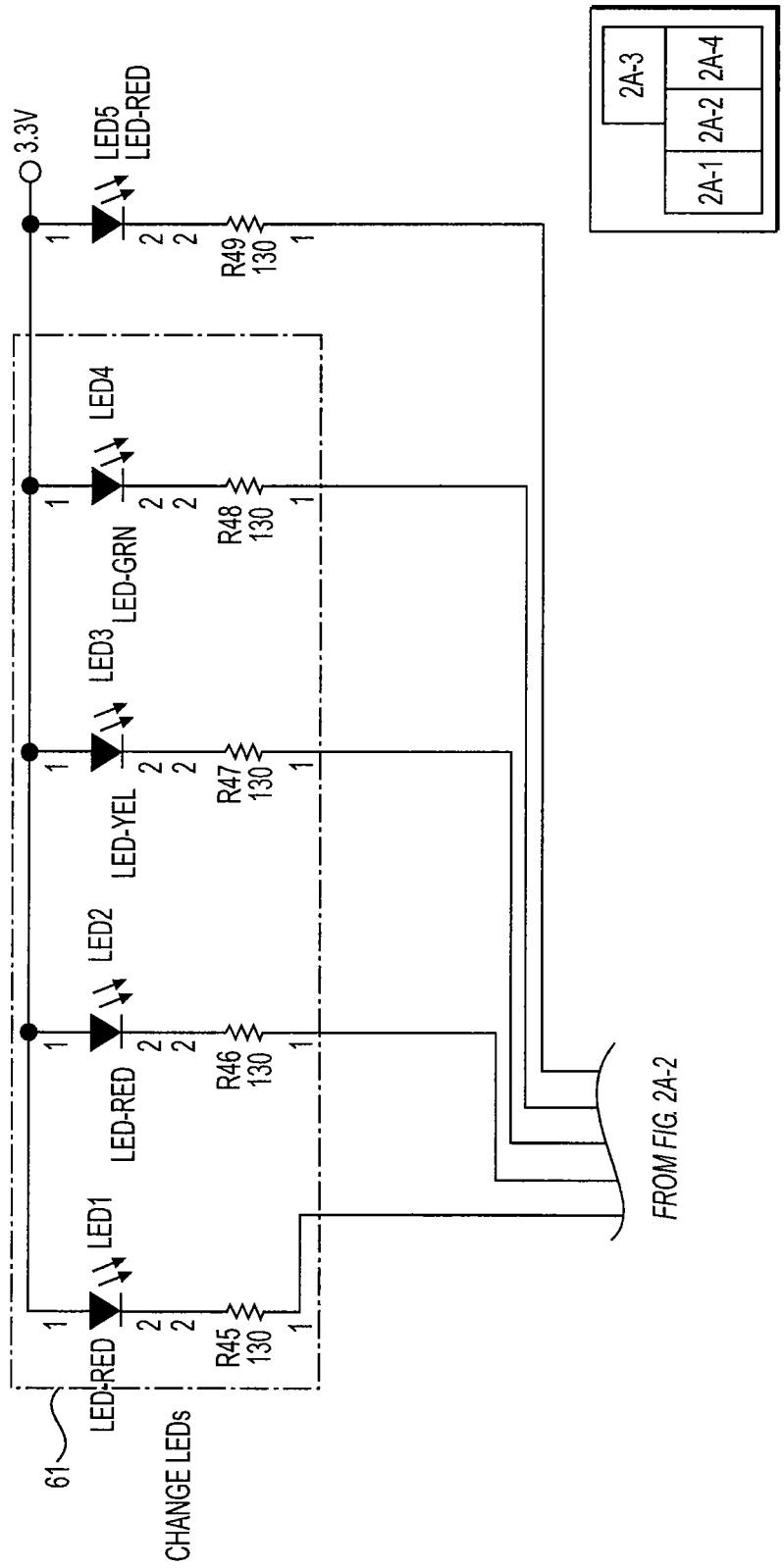
Figures 2, 2A, 3, 4:
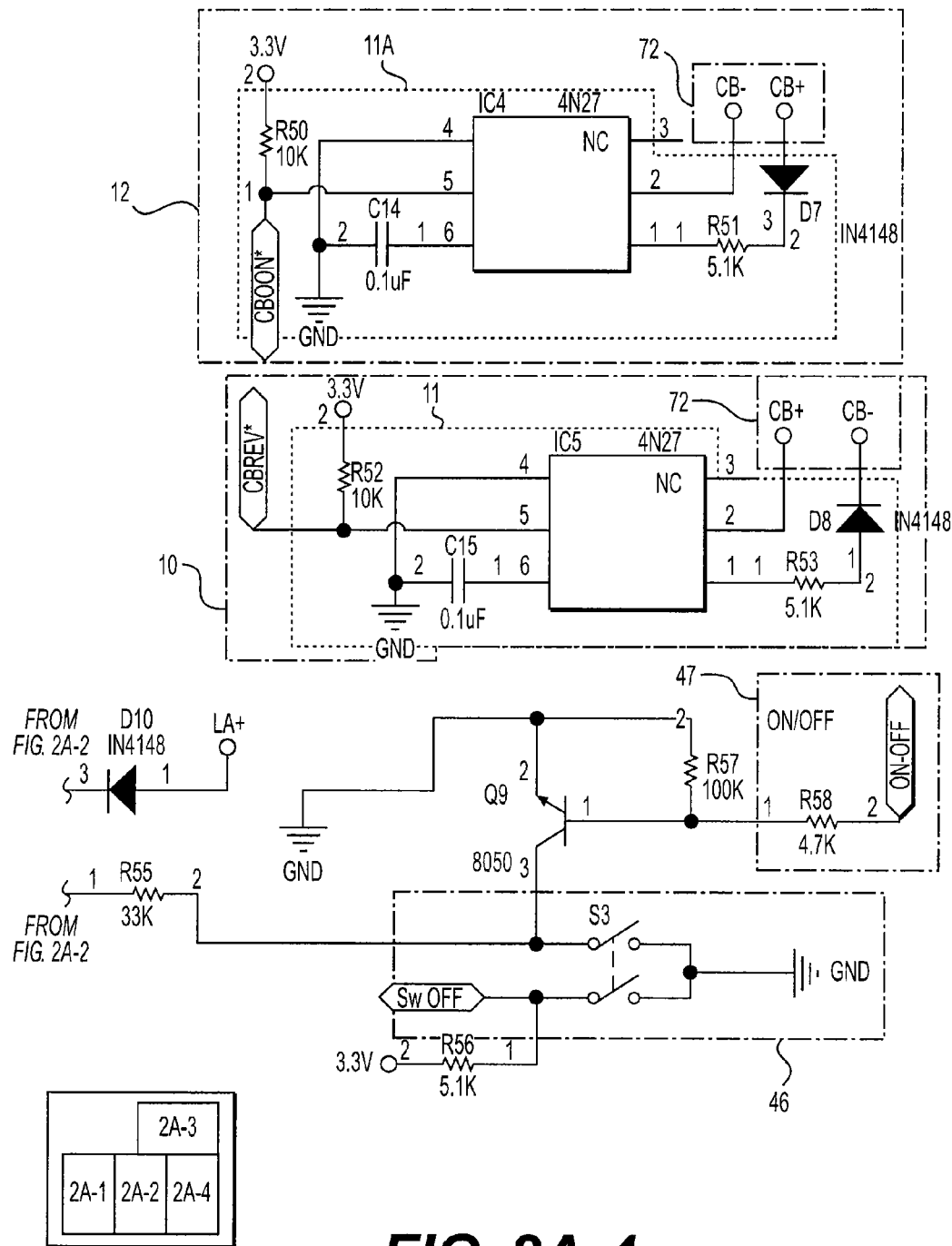
Figure 2B:
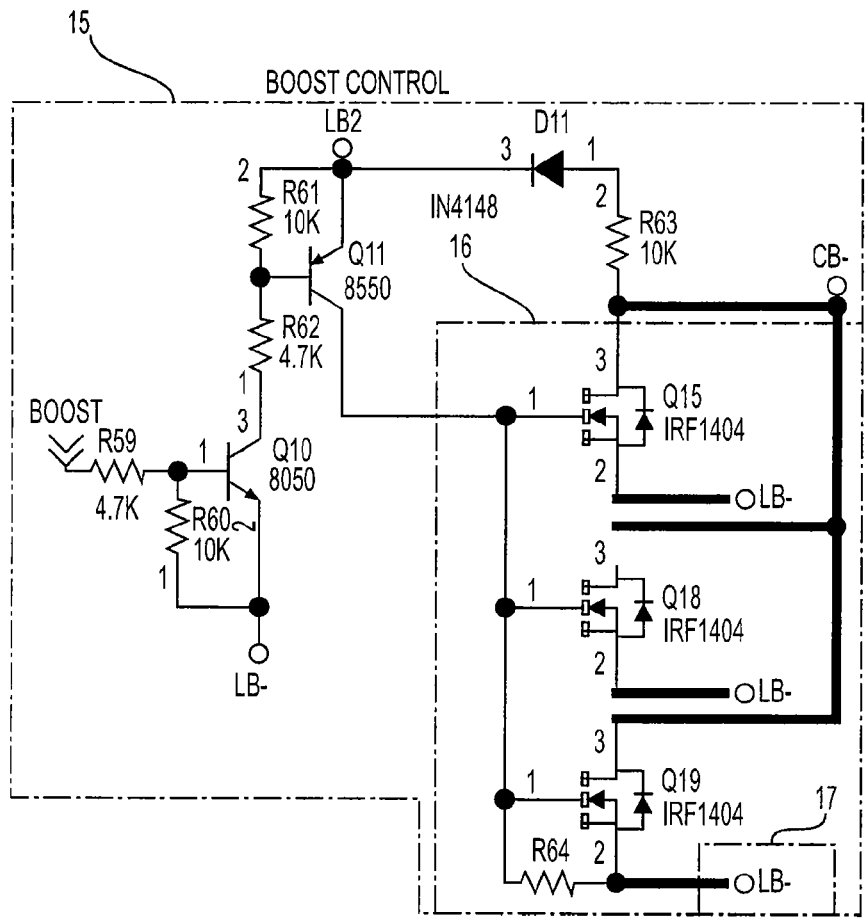
Figure 2:
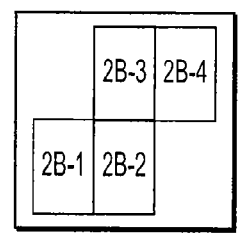
Figures 1, 2C:
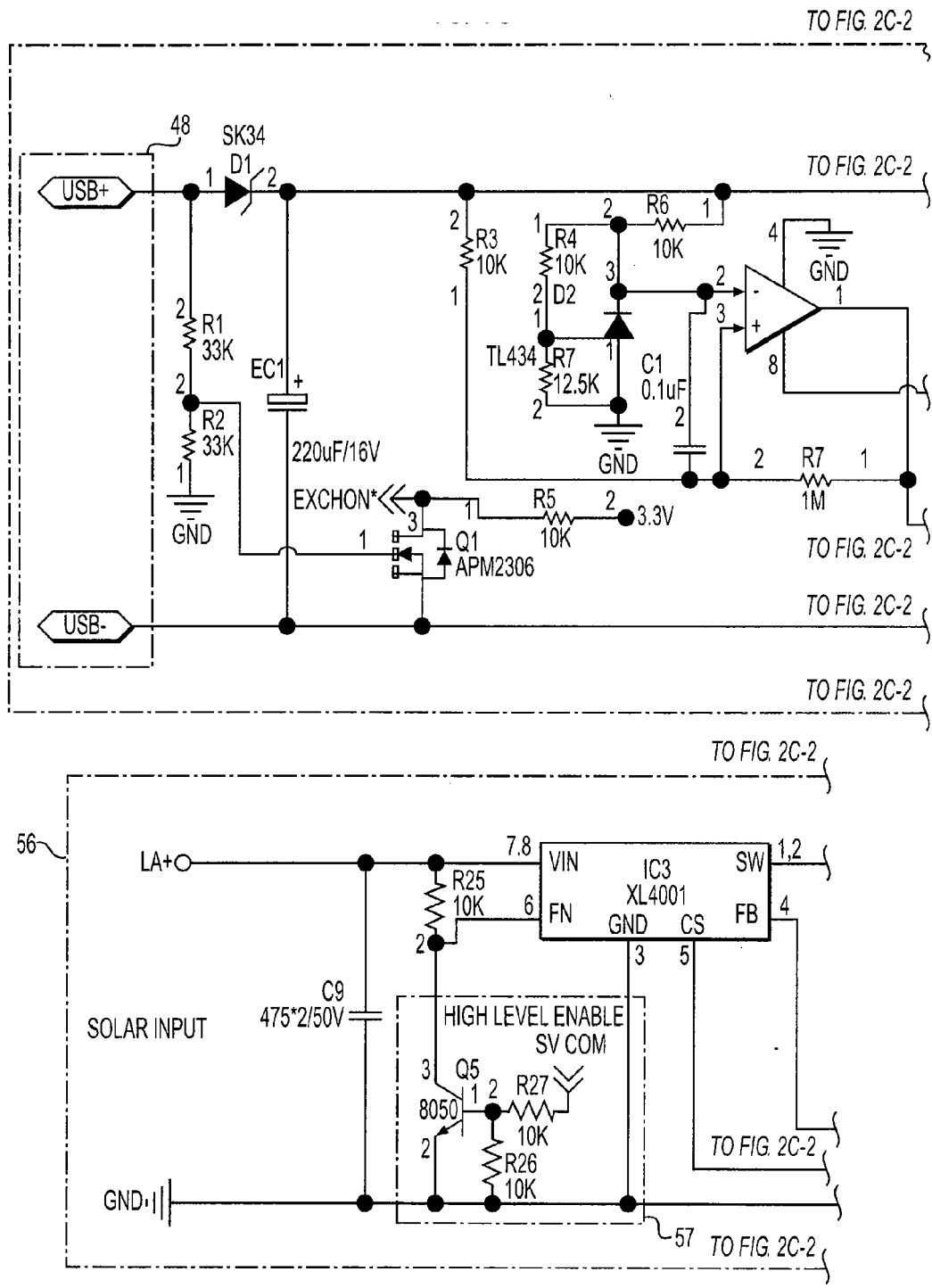
Figures 2, 2C:
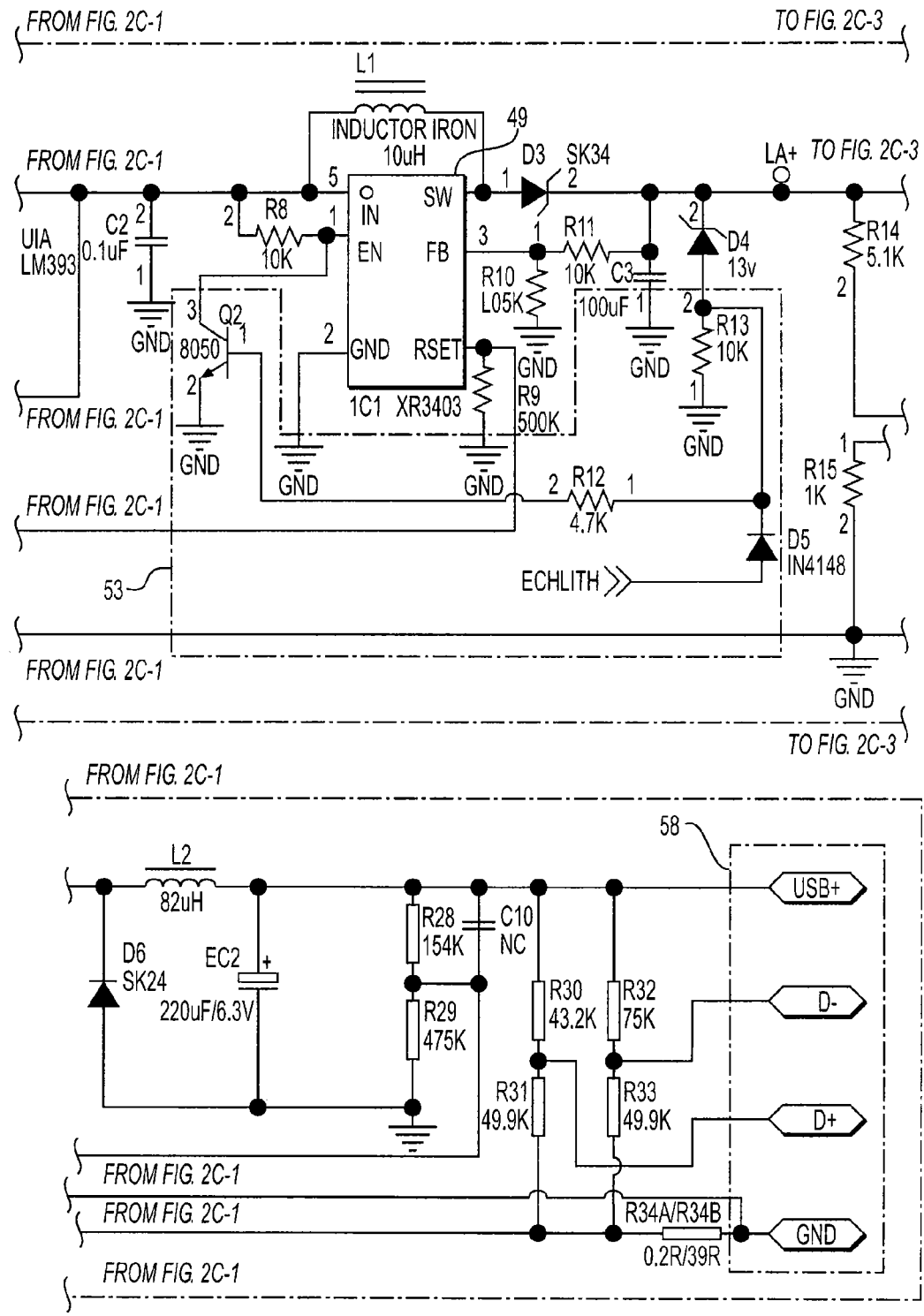
Figure 3:
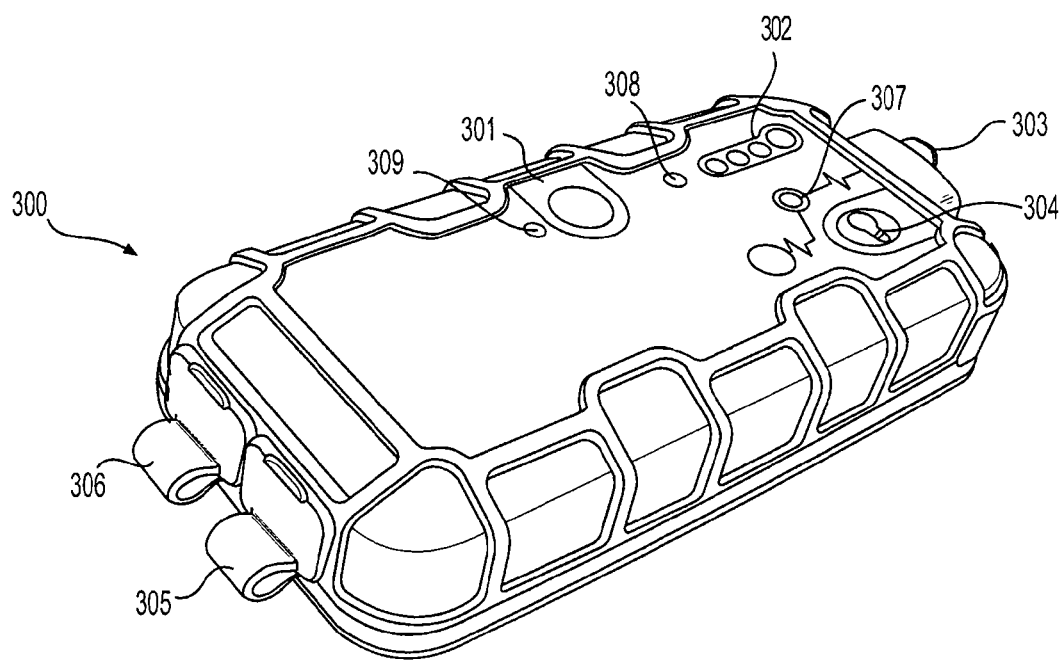
Figure 4:
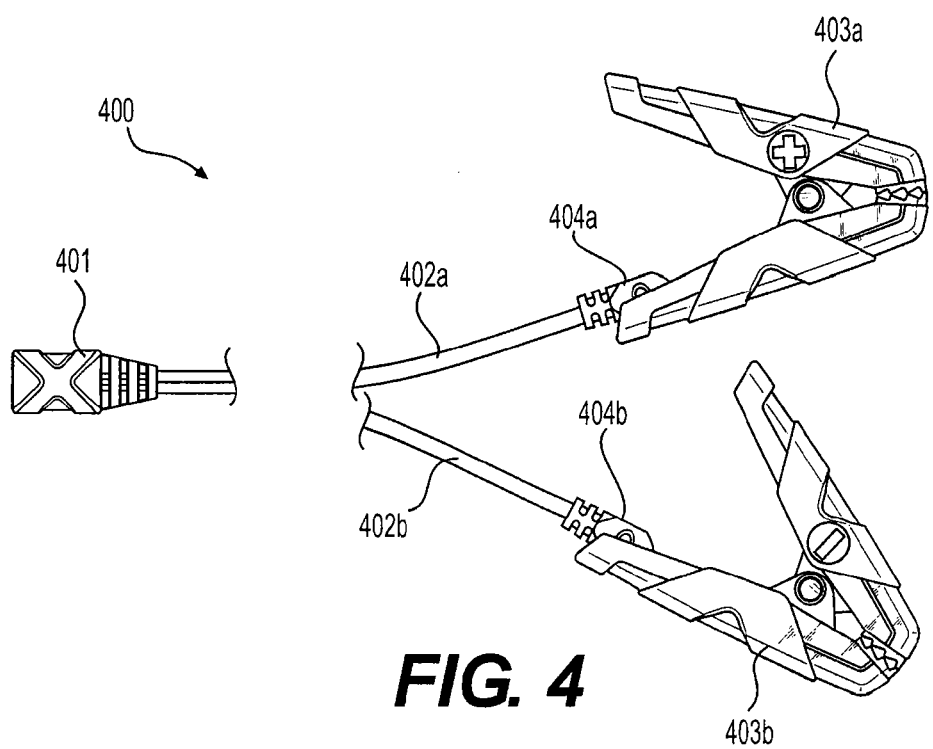
FIG. 4 is a plan view of a jumper cable usable with the handheld jump starter booster device in accordance with another aspect of the invention.

As shown in FIG. 2B-2, the FET smart switch 15 is driven by an output of the microcontroller 1. The FET smart switch 15 includes three FETs (Q15, Q18, and Q19) in parallel, which spreads the distribution of power from the lithium battery pack over the FETs. When that microcontroller output is driven to a logic low, FETs 16 are all in a high resistance state, therefore not allowing current to flow from the internal lithium battery negative contact 17 to the car battery 72 negative contact. When the micro controller output is driven to a logic high, the FETs 16 (Q15, Q18, and Q19) are in a low resistant state, allowing current to flow freely from the internal lithium battery pack negative contact 17 (LB−) to the car battery 72 negative contact (CB−). In this way, the microcontroller software controls the connection of the internal lithium battery pack 32 to the vehicle battery 72 for jumpstarting the car engine.

Referring back to FIG. 2A-1, the internal lithium battery pack voltage can be accurately measured using circuit 24 and one of the analog-to-digital inputs of the microcontroller 1. Circuit 24 is designed to sense when the main 3.3V regulator 42 voltage is on, and to turn on transistor 23 when the voltage of regulator 42 is on. When transistor 23 is conducting, it turns on FET 22, thereby providing positive contact (LB+) of the internal lithium battery a conductive path to voltage divider 21 allowing a lower voltage range to be brought to the microcontroller to be read. Using this input, the microcontroller software can determine if the lithium battery voltage is too low during discharge operation or too high during charge operation, and take appropriate action to prevent damage to electronic components.

Still referring to FIG. 2A-1, the temperature of the internal lithium battery pack 32 can be accurately measured by two negative temperature coefficient (NTC) devices 20. These are devices that reduce their resistance when their temperature rises. The circuit is a voltage divider that brings the result to two analog-to-digital (A/D) inputs on the microcontroller 1. The microcontroller software can then determine when the internal lithium battery is too hot to allow jumpstarting, adding safety to the design.

The main voltage regulator circuit 42 is designed to convert internal lithium battery voltage to a regulated 3.3 volts that is utilized by the microcontroller 1 as well as by other components of the booster device for internal operating power. Three lithium battery back charge protection diodes 28 (see FIG. 2B-1) are in place to allow current to flow only from the internal lithium battery pack 32 to the car battery 72, and not from the car battery to the internal lithium battery. In this way, if the car electrical system is charging from its alternator, it cannot back-charge (and thereby damage) the internal lithium battery, providing another level of safety. The main power on switch 46 (FIG. 2A-1) is a combination that allows for double pole, double throw operation so that with one push, the product can be turned on if it is in the off state, or turned off if it is in the on state. This circuit also uses a microcontroller output 47 to "keep alive" the power when it is activated by the on switch. When the switch is pressed the microcontroller turns this output to a high logic level to keep power on when the switch is released. In this way, the microcontroller maintains control of when the power is turned off when the on/off switch is activated again or when the lithium battery voltage is getting too low. The microcontroller software also includes a timer that turns the power off after a predefined period of time, (such as, e.g. 8 hours) if not used.

The flashlight LED circuit 45 shown in FIG. 2B-3 controls the operation of flashlight LEDs. Two outputs from the microcontroller 1 are dedicated to two separate LEDs. Thus, the LEDs can be independently software-controlled for strobe and SOS patterns, providing yet another safety feature to the booster device. LED indicators provide the feedback the operator needs to understand what is happening with the product. Four separate LEDs 61 (FIG. 2A-3) are controlled by corresponding individual outputs of microcontroller 1 to provide indication of the remaining capacity of the internal lithium battery. These LEDs are controlled in a "fuel gauge" type format with 25%, 50%, 75% and 100% (red, red, yellow, green) capacity indications. An LED indicator 63 (FIG. 2B-4) provides a visual warning to the user when the vehicle battery 72 has been connected in reverse polarity. "Boost" and on/off LEDs 62 provide visual indications when the booster device is provide jump-start power, and when the booster device is turned on, respectively.

A USB output 56 circuit (FIG. 2C-1) is included to provide a USB output for charging portable electronic devices such as smartphones from the internal lithium battery pack 32. Control circuit 57 from the microcontroller 1 allows the USB Out 56 to be turned on and off by software control to prevent the internal lithium battery getting too low in capacity. The USB output is brought to the outside of the device on a standard USB connector 58, which includes the standard voltage divider required for enabling charge to certain smartphones that require it. The USB charge circuit 52 allows the internal lithium battery pack 32 to be charged using a standard USB charger. This charge input uses a standard micro-USB connector 48 allowing standard cables to be used. The 5V potential provided from standard USB chargers is up-converted to the 12.4VDC voltage required for charging the internal lithium battery pack using a DC-DC converter 49. The DC-DC converter 49 can be turned on and off via circuit 53 by an output from the microcontroller 1.

In this way, the microcontroller software can turn the charge off if the battery voltage is measured to be too high by the A/D input 22. Additional safety is provided for helping to eliminate overcharge to the internal lithium battery using a lithium battery charge controller 50 that provides charge balance to the internal lithium battery cells 51. This controller also provides safety redundancy for eliminating over discharge of the internal lithium battery.

FIG. 3 is a perspective view of a handheld device 300 in accordance with an exemplary embodiment of the invention. 301 is a power on switch. 302 shows the LED "fuel gauge" indicators 61. 303 shows a 12 volt output port connectable to a cable device 400, described further below. 304 shows a flashlight control switch for activating flashlight LEDs 45. 305 is a USB input port for charging the internal lithium battery, and 306 is a USB output port for providing charge from the lithium battery to other portable devices such as smartphones, tablets, music players, etc. 307 is a "boost on" indicator showing that power is being provided to the 12V output port. 308 is a "reverse" indicator showing that the vehicle battery is improperly connected with respect to polarity. 309 is a "power on" indicator showing that the device is powered up for operation.

FIG. 4 shows a jumper cable device 400 specifically designed for use with the handheld device 300. Device 400 has a plug 401 configured to plug into 12 volt output port 303 of the handheld device 300. A pair of cables 402a and 402b are integrated with the plug 401, and are respectively connected to battery terminal clamps 403a and 403b via ring terminals 404a and 404b. The port 303 and plug 401 may be dimensioned so that the plug 401 will only fit into the port 303 in a specific orientation, thus ensuring that clamp 403a will correspond to positive polarity, and clamp 403b will correspond to negative polarity, as indicated thereon. Additionally, the ring terminals 404a and 404b may be disconnected from the clamps and connected directly to the terminals of a vehicle battery. This feature may be useful, for example, to permanently attach the cables 302a-302b to the battery of a vehicle. In the event that the battery voltage becomes depleted, the handheld booster device 300 could be properly connected to the battery very simply by plugging in the plug 401 to the port 303. The plug 401 provides both positive polarity and negative polarity cable connections between the port 303 handheld battery charger booster device 300 and the pair of cables 402a and 402b. The plug 401 does not have any exposed prongs, as shown in FIG. 4. Further, the individual cables of the pair of cables at one end are connected together (left side in FIG. 4) and integrated with the plug, and the individual cables at the opposite ends are separated apart (right side in FIG. 4). The plug 401 (FIG. 4) has a uniform width along its body, as shown in FIG. 4. The body of the plug 401 is provided with a protrusion (e.g. X-shaped protrusion). A downwardly tapering connection is located between the body of the plug 401 and the cables 402a and 402b. The downwardly tapering connection having transverse ridges.

The invention having been thus described, it will be apparent to those skilled in the art that the same may be varied in many ways without departing from the spirit or scope of the invention. Any and all such variations are intended to be encompassed within the scope of the following claims.

What is claimed is:

1. A jumper cable device for use with a handheld battery charger booster device for charging a battery, the jumper cable device comprising:
    a single plug having one end configured to fit into a single output port of the handheld battery charger booster device having an internal power supply, the single plug configured to provide both a positive polarity electrical connection and a negative polarity electrical connection configured to cooperate with the single output port of the handheld battery charger booster device; and
    a pair of cables having cable ends integrated with the plug, the pair of cables having opposite cable ends configured to separately connect to the terminals of the battery being charged,
    wherein a body of the single plug has a uniform width, and
    wherein the single plug is configured so that the single plug will only fit into the single outlet port of the handheld battery charger booster device in a single orientation to ensure a proper orientation of positive polarity and negative polarity cable connections between the pair of cable and the single output port of the handheld battery charger booster device.

2. The jumper cable device according to claim 1, wherein the output port and the plug are dimensioned so that the plug will fit into the output port in the specific orientation.

3. The jumper cable device according to claim 1, wherein the plug does not have any exposed prongs.

4. The jumper cable device according to claim 1, further comprising a pair of battery clamps respectively connected to the opposite cable ends of the pair of cables.

5. The jumper cable device according to claim 4, wherein the opposite cable ends of the pair of cables are respectively fitted with ring terminals respectively connecting to the pair of battery clamps.

6. The jumper cable according to claim 1, wherein the pair of cables extend from an opposite end of the plug.

7. The jumper cable according to claim 1, wherein the individual cables of the pair of cables at one end are connected together and integrated with the plug, and the individual cables at the opposite ends are separated apart.

8. The jumper cable according to claim 1, wherein the jumper cable is a single integrated unit after assembly.

9. The jumper cable according to claim 1, wherein the single plug has a uniform rectangular-shaped cross-section along its length.

10. The jumper cable according to claim 1, further comprising a downwardly tapering connection located between the single plug and the cables.

11. The jumper cable according to claim 10, wherein the downwardly tapering connection comprises transverse ridges.

12. The jumper cable according to claim 1, wherein the single plug is provided with a protrusion.

13. The jumper cable according to claim 12, wherein the protrusion is an X-shaped protrusion.

14. A jumper cable device for use with a handheld battery charger booster device for charging a battery, the jumper cable device comprising:
   a single plug having one end configured to fit into a single output port of a handheld battery charger booster device having an internal power supply, the plug providing both positive polarity and negative polarity connections with the handheld battery charger booster device, the plug being configured so that the plug will only fit into the output port in a specific orientation, the plug not having any exposed prongs;
   a pair of cables having cable ends integrated with the plug; and
   a pair of battery terminal clamps respectively connected to opposite cable ends of the pair of cables,
   wherein a body of the single plug has a uniform width, and
   wherein the single plug is configured so that the single plug will only fit into the single outlet port of the handheld battery charger booster device in a single orientation to ensure a proper orientation of positive polarity and negative polarity cable connections between the pair of cable and the single output port of the handheld battery charger booster device.

15. The jumper cable device according to claim 14, wherein the output port and the plug are dimensioned so that the plug will fit into the output port in the specific orientation.

16. The jumper cable device according to claim 14, wherein the opposite cable ends of the pair of cables are respectively fitted with ring terminals respectively connecting to the pair of clamps.

17. The jumper cable according to claim 14, wherein the pair of cables extend from an opposite end of the plug.

18. The jumper cable according to claim 14, wherein the individual cables of the pair of cables at one end are connected together and integrated with the plug, and the individual cables at the opposite ends are separated apart.

19. The jumper cable according to claim 14, wherein the jumper cable is a single integrated unit after assembly.

20. A jumper cable device for use with a handheld battery charger booster device for charging a battery, the jumper cable device comprising:
   a single plug having one end configured to fit into a single output port of the handheld battery charger booster device having an internal power supply, the single plug providing both positive polarity and negative polarity electrical connections with the single output port of the handheld battery charger booster device, the plug being configured so that the single plug will only fit into the single output port in a specific orientation;
   a pair of cables having cable ends integrated with the plug, the pair of cables having opposite cable ends configured to separately connect to the terminals of the battery being charged; and
   a pair of battery clamps respectively connected to the opposite cable ends of the pair of cables,
   wherein the opposite cable ends of the pair of cables are respectively fitted with ring terminals respectively connecting to the pair of battery clamps.

21. A jumper cable device for use with a handheld battery charger booster device for charging a battery, the jumper cable device comprising:
   a single plug having one end configured to fit into a single output port of a handheld battery charger booster device having an internal power supply, the plug providing both positive polarity and negative polarity connections with the handheld battery charger booster device, the plug being configured so that the plug will only fit into the output port in a specific orientation, the plug not having any exposed prongs;
   a pair of cables having cable ends integrated with the plug; and
   a pair of battery terminal clamps respectively connected to opposite cable ends of the pair of cables,
   wherein the opposite cable ends of the pair of cables are respectively fitted with ring terminals respectively connecting to the pair of clamps.

* * * * *